(12) United States Patent
Vermeersch et al.

(10) Patent No.: US 9,539,899 B2
(45) Date of Patent: Jan. 10, 2017

(54) RAKE LEVER ACTUATED SHIFT MECHANISM CLAMP

(71) Applicant: STEERING SOLUTIONS IP HOLDING CORPORATION, Saginaw, MI (US)

(72) Inventors: Michael C. Vermeersch, Essexville, MI (US); Arthur W. Nellett, Davison, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 51 days.

(21) Appl. No.: 14/601,661

(22) Filed: Jan. 21, 2015

(65) Prior Publication Data

US 2015/0202961 A1    Jul. 23, 2015

Related U.S. Application Data

(60) Provisional application No. 61/930,706, filed on Jan. 23, 2014.

(51) Int. Cl.
   *B60K 20/06* (2006.01)
   *B62D 1/185* (2006.01)
   *B62D 1/184* (2006.01)

(52) U.S. Cl.
   CPC .............. *B60K 20/06* (2013.01); *B62D 1/184* (2013.01); *B62D 1/185* (2013.01); *Y10T 74/20146* (2015.01)

(58) Field of Classification Search
   CPC ......... B60K 20/06; B62D 1/184; B62D 1/185; Y10T 74/20146

USPC ............................... 74/473.31, 493; 280/775
See application file for complete search history.

(56) References Cited

U.S. PATENT DOCUMENTS

| | | | |
|---|---|---|---|
| 3,596,531 A | 8/1971 | Grosseau | |
| 4,132,123 A | 1/1979 | Ishii | |
| 4,267,743 A | 5/1981 | Tanaka | |
| 4,480,494 A | 11/1984 | Gilmore | |
| 4,537,088 A | 8/1985 | Kubota | |
| 4,762,015 A | 8/1988 | Katayama | |
| 4,936,431 A | 6/1990 | Shinpo | |
| 4,955,935 A | 9/1990 | Katayama | |
| 7,125,027 B2* | 10/2006 | Sap | B60G 9/02 280/124.11 |
| 7,621,562 B2* | 11/2009 | Longo | B62D 1/187 280/775 |
| 7,690,685 B2* | 4/2010 | Sasaoka | B62D 7/09 280/513 |
| 2001/0022111 A1 | 9/2001 | Ritchie | |

(Continued)

*Primary Examiner* — Karen Beck
(74) *Attorney, Agent, or Firm* — Cantor Colburn LLP

(57) ABSTRACT

A clamp assembly for a vehicle shift mechanism includes a steering column having a stationary portion and a moveable portion. The clamp assembly also includes a shifter operatively coupled to the moveable portion of the steering column and slidably engaged with the stationary portion of the steering column. The clamp assembly further includes a primary rake lever configured to translationally adjust the moveable portion of the steering column. The clamp assembly yet further includes a secondary rake lever operatively coupled to the primary rake lever and operative to exert a clamping force on a portion of the shifter during translational adjustment of the moveable portion.

15 Claims, 8 Drawing Sheets

(56) References Cited

U.S. PATENT DOCUMENTS

| | | | |
|---|---|---|---|
| 2001/0029802 A1* | 10/2001 | Bowerman | B62D 1/184 74/493 |
| 2003/0213673 A1 | 11/2003 | Burr | |
| 2005/0127656 A1* | 6/2005 | Sato | B62D 1/184 280/775 |
| 2005/0183534 A1* | 8/2005 | Maida | B62D 1/184 74/492 |
| 2006/0082122 A1 | 4/2006 | Uehle | |
| 2008/0150269 A1* | 6/2008 | Longo | B62D 1/187 280/775 |
| 2008/0238068 A1* | 10/2008 | Kumar | B62D 1/183 280/775 |
| 2008/0257097 A1* | 10/2008 | Graf | B62D 1/184 74/493 |
| 2009/0056493 A1 | 3/2009 | Dubay | |
| 2009/0241721 A1* | 10/2009 | Inoue | B62D 1/195 74/493 |
| 2010/0219624 A1* | 9/2010 | Matsuno | B62D 1/195 280/779 |
| 2010/0301593 A1* | 12/2010 | Sakata | B62D 1/184 280/775 |
| 2011/0185839 A1* | 8/2011 | Inoue | B62D 1/195 74/493 |
| 2012/0125139 A1* | 5/2012 | Tinnin | B62D 1/195 74/493 |
| 2012/0285286 A1* | 11/2012 | Schnitzer | B62D 1/195 74/493 |
| 2014/0000405 A1* | 1/2014 | Anspaugh | B62D 1/184 74/493 |
| 2015/0202960 A1* | 7/2015 | Vermeersch | F16H 59/02 74/473.31 |
| 2015/0202961 A1* | 7/2015 | Vermeersch | B62D 1/184 74/473.31 |
| 2015/0266497 A1* | 9/2015 | Yoshihara | B62D 1/184 74/493 |
| 2015/0360712 A1* | 12/2015 | Baumeister | B62D 1/184 403/53 |
| 2015/0375771 A1* | 12/2015 | Tinnin | G05G 5/04 74/493 |
| 2016/0059880 A1* | 3/2016 | Bouvier | B62D 1/16 74/493 |
| 2016/0075367 A1* | 3/2016 | Sakuda | B62D 1/184 74/493 |

* cited by examiner

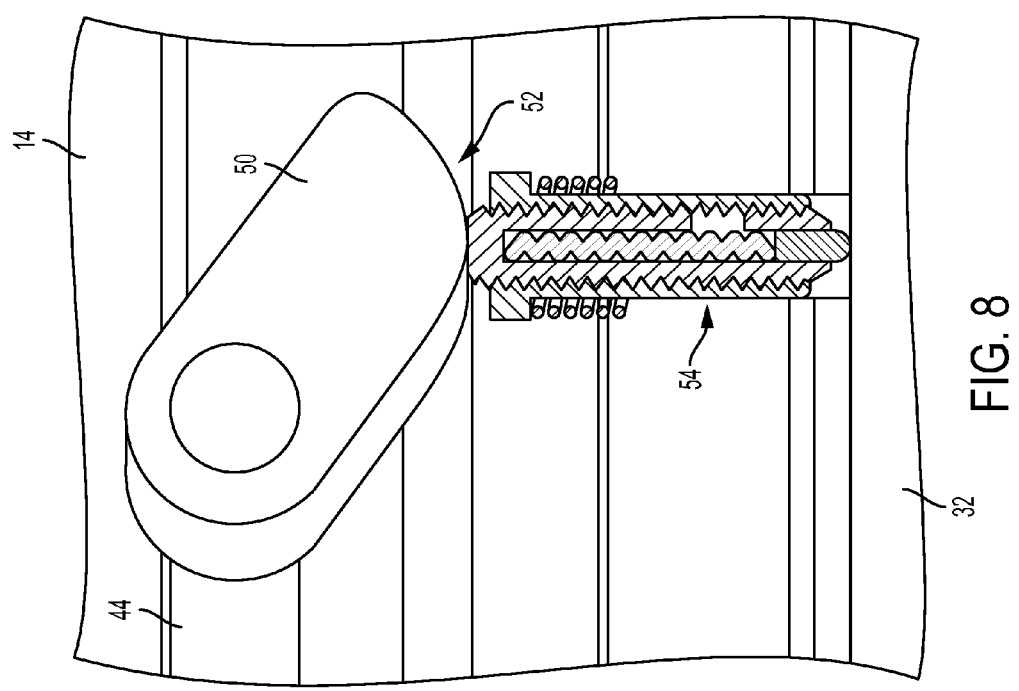

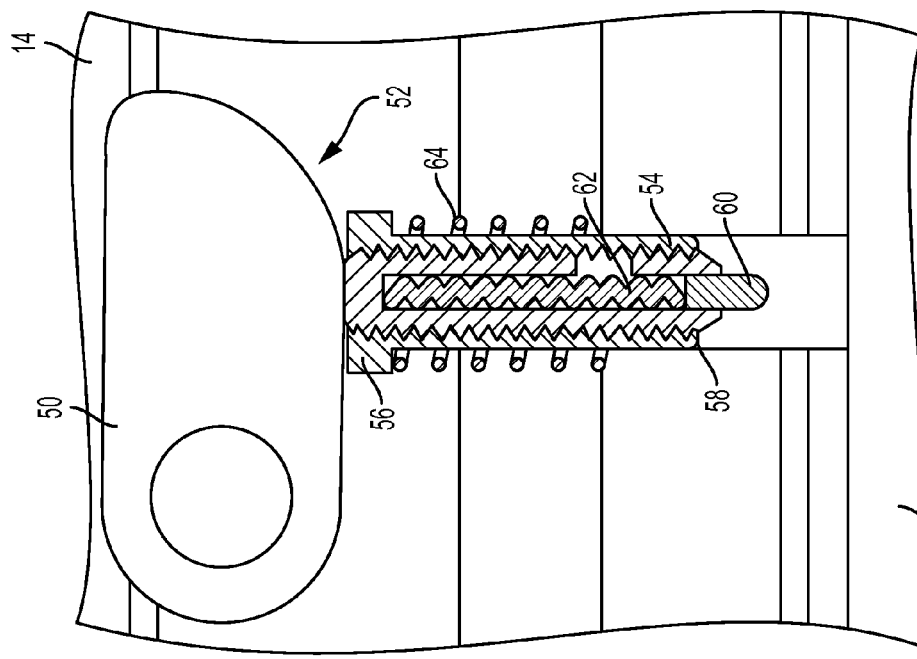
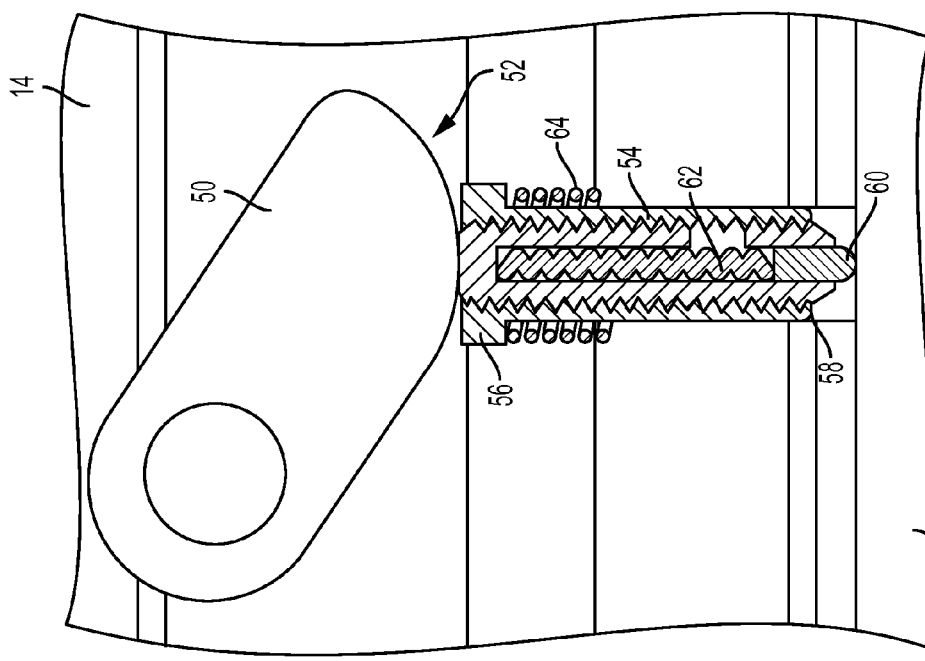

RAKE LEVER ACTUATED SHIFT MECHANISM CLAMP

CROSS-REFERENCE TO RELATED APPLICATION

This patent application claims priority to U.S. Provisional Patent Application Ser. No. 61/930,706, filed Jan. 23, 2014, which is incorporated herein by reference in its entirety.

BACKGROUND OF THE INVENTION

The subject matter disclosed herein relates to steering column mounted transmission shifters and, more particularly, to a glide system for shifter mechanisms mounted to steering columns.

Internally collapsing steering column designs that are cantilever in nature generally have low stiffness and poor natural frequency. If the application requires a column mounted shift system, the location of the shifter poses challenges.

If the shifter is mounted forward in the vehicle on a stationary structure portion of the steering column, the shift lever requires a severe off-set and/or the shift mechanism is cantilevered rearward (towards the driver) which creates a moment and high stress on the attachment. Conversely, mounting the shifter rearward in the vehicle on the upper-head telescoping portion of the steering column creates issues with collapse, NVH and anti-rotation reaction loads from the shift lever.

SUMMARY OF THE INVENTION

In accordance with an exemplary embodiment of the invention, a clamp assembly for a vehicle shift mechanism includes a steering column having a stationary portion and a moveable portion. The clamp assembly also includes a shifter operatively coupled to the moveable portion of the steering column and slidably engaged with the stationary portion of the steering column. The clamp assembly further includes a primary rake lever configured to translationally adjust the moveable portion of the steering column. The clamp assembly yet further includes a secondary rake lever operatively coupled to the primary rake lever and operative to exert a clamping force on a portion of the shifter during translational adjustment of the moveable portion.

In accordance with another exemplary embodiment of the invention, a clamp assembly for a vehicle shift mechanism includes a steering column having a stationary portion and a moveable portion. The clamp assembly also includes a shifter operatively coupled to the moveable portion of the steering column and slidably engaged with the stationary portion of the steering column. The clamp assembly further includes a primary rake lever configured to translationally adjust the movebale portion of the steering column. The clamp assembly yet further includes a secondary rake lever operatively coupled to the primary rake lever. The clamp assembly also includes a cam portion of the secondary rake lever configured to bias a bolt against a portion of the shifter in a locked position, the bolt being spring biased to retract away from contact with the portion of the shifter in an unlocked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 8 is an enlarged view of a portion of the clamp assembly according to the embodiment of FIG. 6;

FIG. 11 is a partial cross-sectional view of a portion of the clamp assembly according to the embodiment of FIG. 6, illustrating the steering column in a locked position; and FIG. 12 is a partial cross-sectional view of a portion of the clamp assembly according to the embodiment of FIG. 6, illustrating the steering column in an unlocked position.

DETAILED DESCRIPTION

Referring now to the Figures, where the invention will be described with reference to specific embodiments, without limiting same, a clamp assembly for a shifter mechanism operatively coupled to a vehicle steering column is disclosed.

Figure 1:
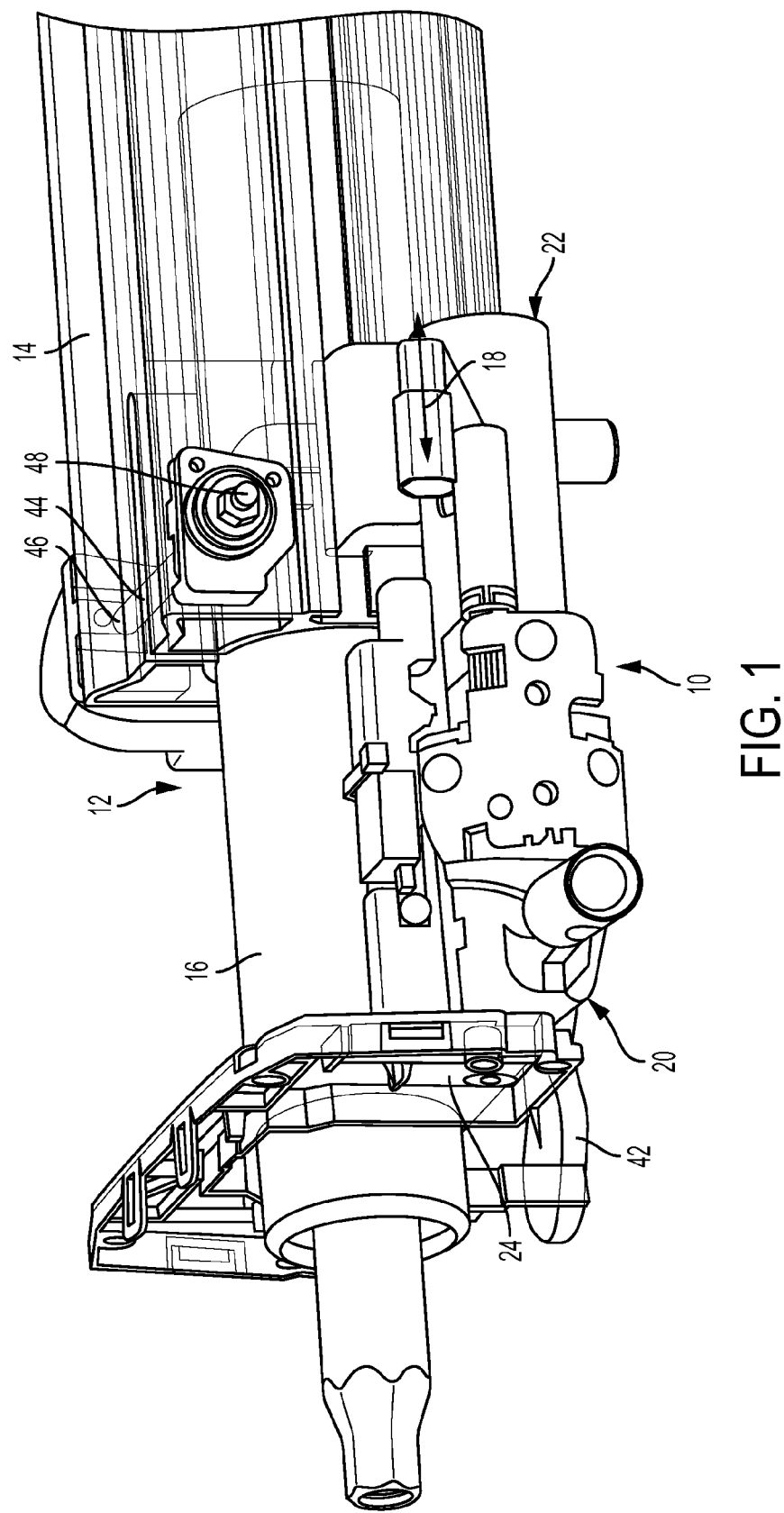
FIG. 1 is a perspective view of a shifter mechanism operatively coupled to a steering column with a clamp assembly according to an embodiment of the invention.

Referring to FIG. 1, a shifter mechanism is generally shown at 10. The shifter mechanism 10 is for a vehicle having a transmission. As shown, the shifter mechanism 10 is mounted to the vehicle at a steering column 12 and is connected to the transmission as is known in the art. The shifter mechanism 10 operates the transmission by changing drive gears of the transmission.

The steering column 12 includes a stationary portion 14 and a moveable portion 16. The moveable portion 16 is in telescoping engagement with the stationary portion 14. The telescoping relationship between the moveable portion 16 and the stationary portion 14 advantageously allows a user to adjust a steering wheel (not shown) of a vehicle in a translatable manner to a desirable position. Additionally, the telescoping relationship facilitates a collapsible function of the steering column 12 in the event of an energy absorption event, such as impact by the user with the steering wheel.

As will be appreciated from the description herein, the shifter mechanism 10 is engaged with both the stationary portion 14 and the moveable portion 16 of the steering column 12 to avoid a cantilevered disposition of the shifter mechanism 10, thereby reducing excessive moments, while also accommodating the collapsibility requirements of the steering column 12.

The shifter mechanism 10 extends in a longitudinal direction 18 from a first end region 20 to a second end region 22.

The first end region 20 is operatively coupled to the moveable portion 16 of the steering column 12. In one embodiment, the operative coupling is made indirectly by coupling the shifter mechanism 10 to a plate 24 that is secured to the moveable portion 16. Coupling of the first end region 20 to the plate 24 is made in any suitable manner, including with mechanical fasteners such as bolts, pins or the like, for example. In one embodiment, the plate 24 includes one or more recessed regions in the form of a countersink or counterbore to accommodate a head of a mechanical fastener to easily identify fastener location and to maintain a flush surface along the plate.

Figure 2:
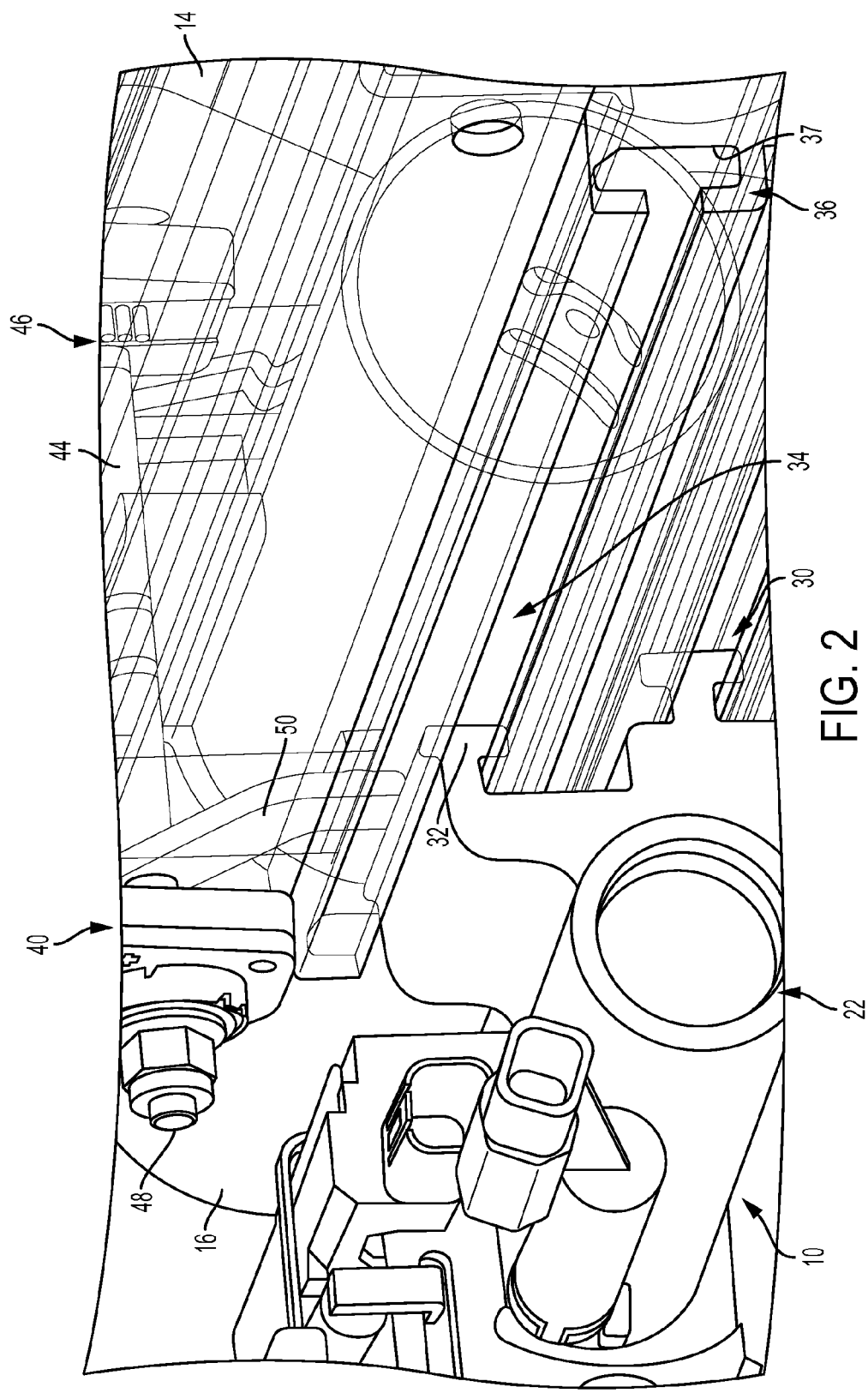
FIG. 2 is a perspective view of the clamp assembly according to the embodiment of FIG. 1.
Figure 3:
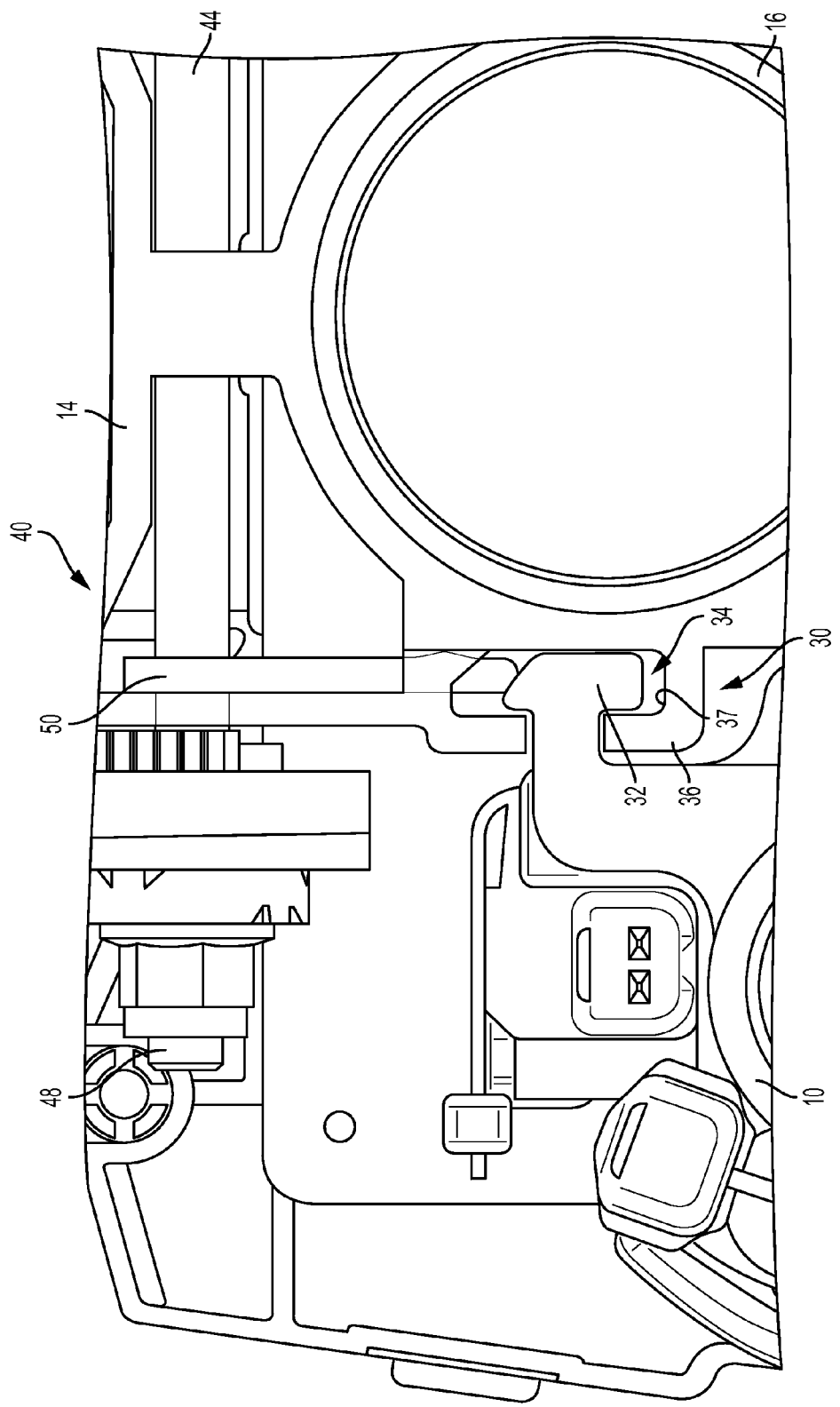
FIG. 3 is an end view of the clamp assembly according to another aspect of the embodiment of FIG. 1.

Referring now to FIGS. 2 and 3, with continued reference to FIG. 1, a glide system 30 is illustrated in association with the shifter mechanism 10 and the stationary portion 14 of the steering column 12. This glide system 30 mounts the shifter mechanism 10 to the stationary portion 10 in a translatable manner to facilitate sliding of the shifter mechanism 10, as needed. The glide system 30 provides primary reaction to shift loads without requiring a permanent traditional fastener.

The glide system 30 includes a sliding member 32 extending from the shifter mechanism 10 as a protrusion. The sliding member 32 may be in the form of numerous contemplated geometries. In one embodiment, the sliding member 32 is substantially "T-shaped." The sliding member 32 is disposed within a slot 34 defined by the stationary portion 14 of the steering column 12. In one embodiment, the stationary portion 14 includes a bracket 36 extending therefrom, with an inner wall 37 of the bracket 36 defining the slot 34. The bracket 36 may be a separate component that is operatively coupled to the stationary portion 14 or may be integrally formed with the stationary portion 14. Regardless, the sliding member 32 is disposed within the slot 34 in a manner that allows for sliding movement of the sliding member 32 and therefore the shifter mechanism 10 as a whole. Although a single sliding member and slot are described above, as shown in the illustrated embodiments, a plurality of sliding members and slots are provided in some embodiments.

The slot 34 is dimensioned to accommodate a predetermined full collapse range for energy absorption. The distance required will vary depending upon the particular application of use. The slot 34 includes an open end on at least one side of the extrusion to allow access for assembly and/or serviceability. In one embodiment, the slot 34 is open at both ends to permit access from either end.

With continued reference to FIGS. 1-3, a clamp assembly 40 according to a first embodiment is provided to selectively lock and unlock the shifter mechanism 10 relative to the stationary portion 14 of the steering column. As will be appreciated from the description herein, the clamp assembly 40 permits translation of the shifter mechanism 10 relative to the stationary portion 14.

The clamp assembly 40 includes a primary rake lever 42 that is configured to be manipulated by a user between a locked position and an unlocked position. The terms "locked position" and "unlocked position," as used herein, refer to an overall locked and unlocked position of the overall clamp assembly 40, even where referenced in conjunction with an individual component, or components, of the clamp assembly 40. The primary rake lever 42 is employed by a user to modify the position of the moveable portion 16 of the steering column 12, as desired. The movement of the moveable portion 16 is translational in a telescoping manner with the stationary portion 14. The primary rake lever 42 extends toward the stationary portion 14 of the steering column and is operatively coupled to a rake bolt 44 that extends transversely relative to the longitudinal direction 18 shown in FIG. 1. The rake bolt 44 includes a first end 46 and a second end 48. The first end 46 is operatively coupled to the primary rake lever 42 and the second end 48 is operatively coupled to a secondary rake lever 50. In some embodiments, the rake bolt 44 extends through, or is operatively coupled to, the stationary portion 14 of the steering column 12 proximate the first and second ends 46, 48 of the rake bolt 44. In some embodiments, the primary rake lever 42, the rake bolt 44 and the secondary rake lever 50 are integrally formed of a unitary structure.

Based on the coupled relationship of the primary rake lever 42, the rake bolt 44 and the secondary rake lever 50, manual rotation of the primary rake lever 42 imparts rotation of the rake bolt 44 and therefore the secondary rake lever 50. Rotation of these components allows for repeated transition between the locked position and the unlocked position.

Figure 5:
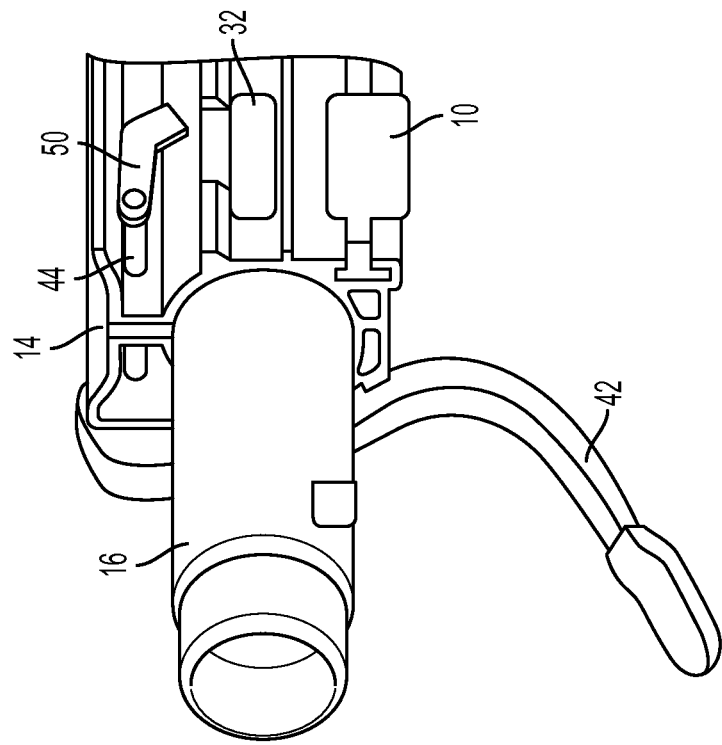
FIG. 5 is a perspective view of the steering column in an unlocked position according to the embodiment of FIG. 1.
Figure 4:
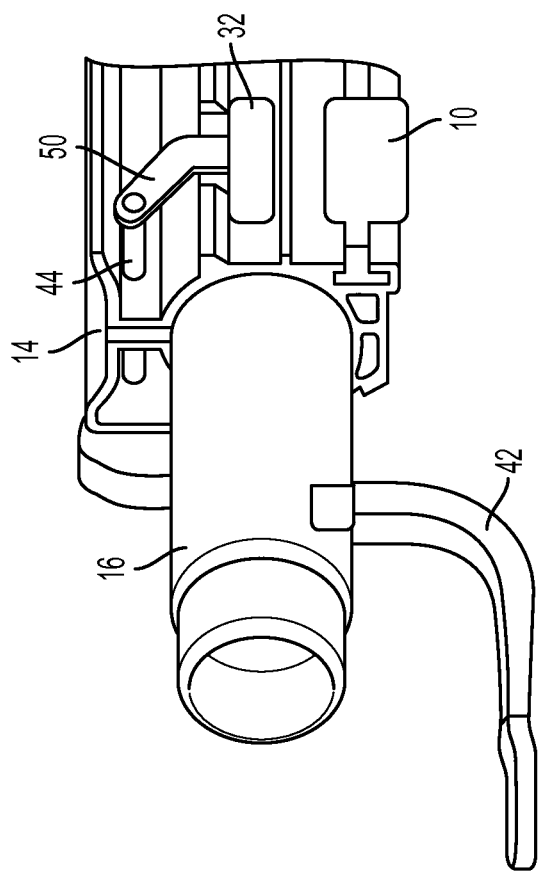
FIG. 4 is a perspective view of the steering column in a locked position according to the embodiment of FIG. 1.

FIGS. 4 and 5 illustrate the respective positions of the clamp assembly 40. Specifically, the locked position is illustrated in FIG. 4 and the unlocked position is illustrated in FIG. 5. Reference to FIGS. 1-4 of the clamp assembly 40 in the locked position shows the secondary rake lever 50 in engagement with a portion of the shifter mechanism 10. The engagement of the secondary rake lever 50 with the shifter mechanism 10 exerts a clamping force on the shifter mechanism 10 to maintain the position of the shifter mechanism 10 relative to the stationary portion 14 of the steering column 12. As best shown in FIG. 3, the secondary rake lever 50 clamps the sliding member 32 of the shifter mechanism 10 between the secondary rake lever 50 and a surface of the stationary portion 14 of the steering column 12. In one embodiment, the sliding member 32 is clamped between the secondary rake lever 50 and the inner wall 37 of the bracket 36 that defines the slot 34.

The clamping force provided by the secondary rake lever 50 fixes the position of the shifter mechanism 10 relative to the stationary portion 14, as described above. In the event a user desires adjustment of the steering wheel of the vehicle, movement of the moveable portion 16 is required. Based on the coupled relationship between the moveable portion 16 and the shifter mechanism 10, adjustment of the shifter mechanism 10 is also required. To accommodate the required translation of the shifter mechanism 10 relative to the stationary portion 14, the clamping force of the secondary rake lever 50 is removed by disengaging the secondary rake lever 50 from the shifter mechanism 10. This is facilitated by movement of the primary rake lever 42, thereby rotating the rake bolt 44 and the secondary rake lever 50. Upon rotation of the secondary rake lever 50, disengagement of the secondary rake lever 50 from the shifter mechanism 10 is achieved. In the above-described embodiment relating to clamping of the sliding member 32 between the secondary rake lever 50 and the inner wall 37 of the bracket 36, disengagement eliminates the clamping force. Elimination of the clamping force allows the sliding member 32, and therefore the shifter mechanism 10, to translate freely relative to the stationary portion 14 of the steering column 12.

Referring to FIGS. 6-12, another embodiment of the clamp assembly 40 is illustrated. In the illustrated embodiment, the secondary rake lever 50 is not in direct contact with any portion of the shifter mechanism 10, including the sliding member 32. Rather, the secondary rake lever 50 has a cam region 52 that actuates a bolt 54 to clamp the shifter mechanism 10 in place. The bolt 54 is operatively coupled to the cam region 52 of the secondary rake lever 50 at a first end 56 of the bolt 54. In the locked position shown in FIGS.

6 and 8-11, a second end 58 of the bolt 54 is driven into contact with a portion of the shifter mechanism 10, such as the sliding member 32, to exert the clamping force required to maintain the position of the shifter mechanism relative to the stationary portion 14 of the steering column 12. The bolt 54 has a plunger 60 attached to the second end 58 and protruding therefrom to engage the shifter mechanism 10, as needed. The plunger 60 is pre-loaded with an internal biasing member 62 and accommodates tolerance stack to ensure contact with the shifter mechanism 10. The plunger 60 also provides a fuse to prevent the secondary rake lever 50 from unlocking due to back-drive forces.

Figure 7:
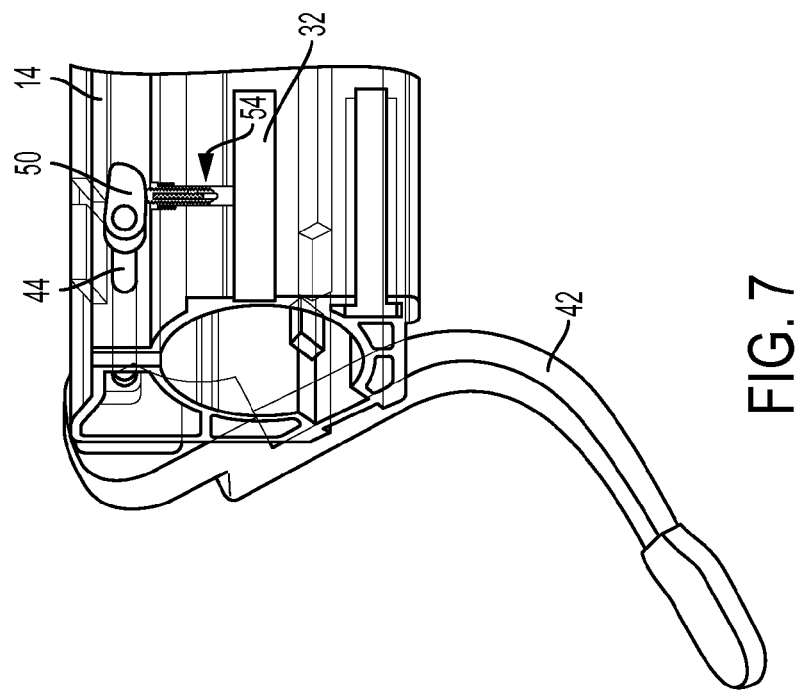
FIG. 7 is a perspective view of the clamp assembly according to the embodiment of FIG. 6, illustrating the steering column in an unlocked position.
Figure 6:
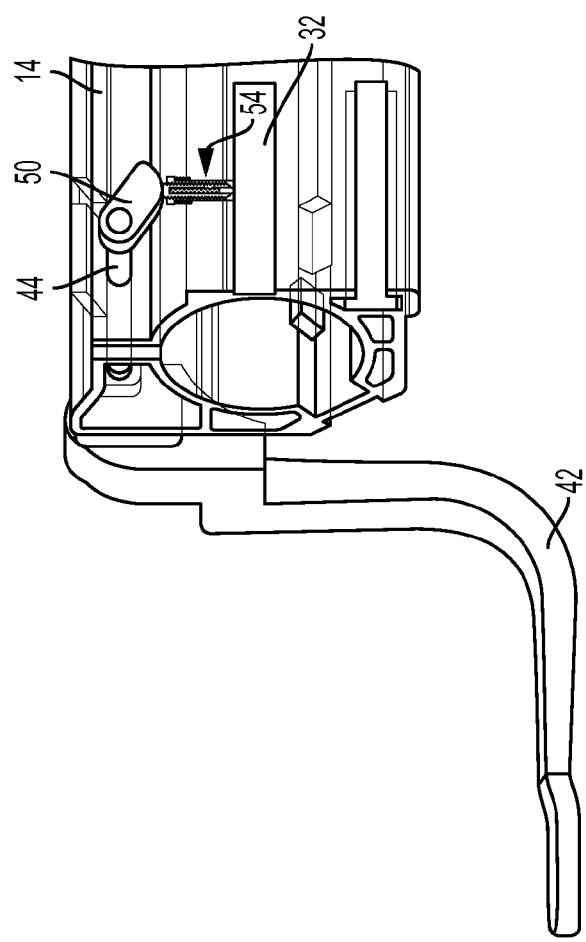
FIG. 6 is a perspective view of the clamp assembly according to another embodiment, illustrating the steering column in a locked position.
Figure 10:
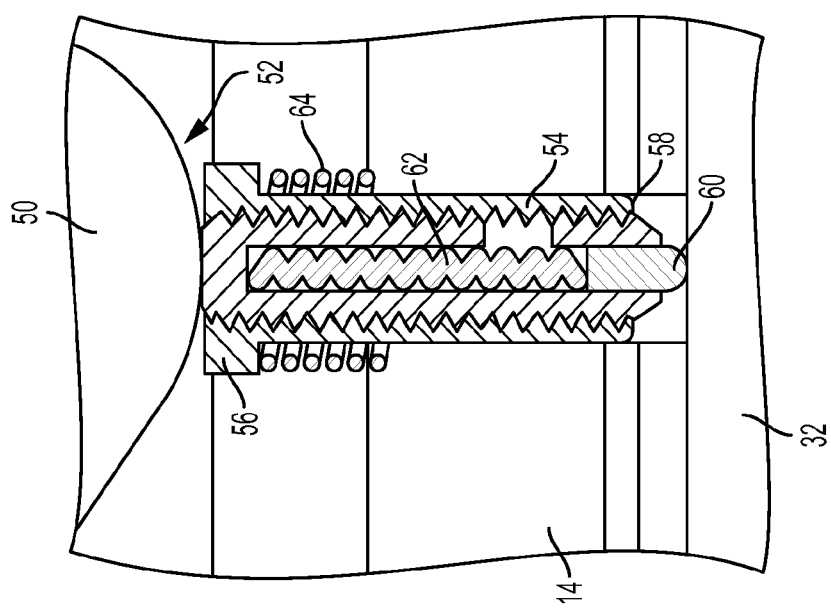
FIG. 10 is a cross-sectional view of a portion of the clamp assembly according to the embodiment of FIG. 6.
Figure 9:
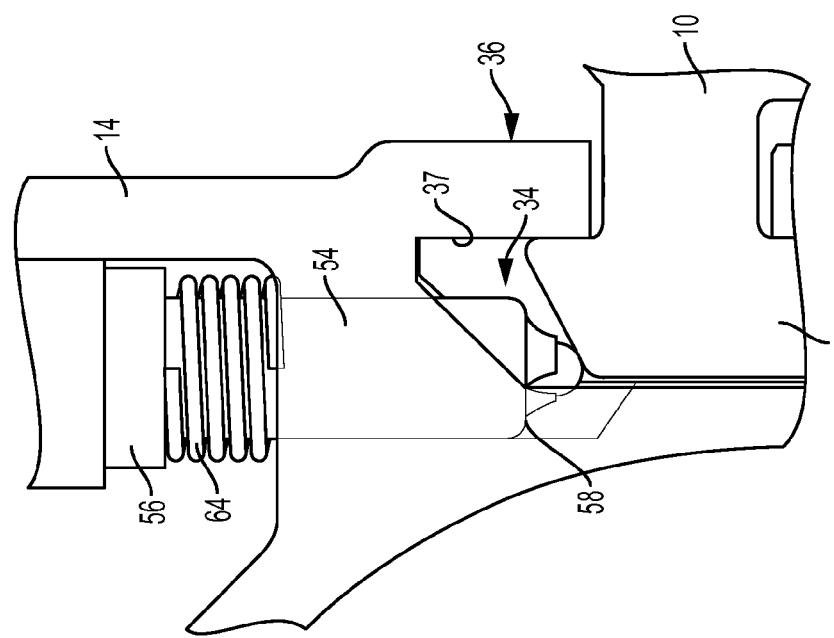
FIG. 9 is an end view of a portion of the clamp assembly according to the embodiment of FIG. 6.

Upon movement of the clamping assembly 60 to the unlocked position shown in FIGS. 7 and 12, the bolt 54 is disengaged from the shifter mechanism 10. As the secondary rake lever 50 is rotated, the bolt 54 is moved away from the shifter mechanism 10 based on the operative coupling of the bolt 54 to the secondary rake lever 50. To assist with the unloading effort and to ensure disengagement, the bolt 54 is spring loaded to retract the bolt 54 and allow translation of the shifter mechanism 10. Spring loading is achieved with a bolt spring 64 that surrounds a portion of the bolt 54.

Advantageously, each of the embodiments described above provides a coupled interface between the shifter mechanism 10 and the steering column 12 at both the stationary portion 14 and the moveable portion 16 of the steering column 12 to enhance the stiffness of the system, while also accommodating the telescoping requirements of the steering column. The embodiments of the clamping assembly 40 provide locking and unlocking control of the shifter mechanism to fix the position of the shifter mechanism 10 and to selectively adjust the shifter mechanism 10 and the moveable portion 16 of the steering column 12.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A clamp assembly for a vehicle shift mechanism comprising:
   a steering column having a stationary portion and a moveable portion;
   a shifter operatively coupled to the moveable portion of the steering column and slidably engaged with the stationary portion of the steering column;
   a primary rake lever configured to translationally adjust the moveable portion of the steering column;
   a secondary rake lever operatively coupled to the primary rake lever and operative to exert a clamping force on a portion of the shifter during translational adjustment of the moveable portion; and
   a rake bolt operatively coupled to the primary rake lever and to the stationary portion of the steering column, the secondary rake lever operatively coupled to the rake bolt, the rake bolt and the secondary rake lever each rotatable upon rotation of the primary rake lever, the secondary rake lever rotatable between a locked position and an unlocked position;
   further comprising a glide system comprising:
      a sliding member extending from the shifter; and
      a bracket extending from the stationary portion, the bracket having an inner wall defining a slot extending longitudinally along the stationary portion, the sliding member slidably disposed within the slot; the sliding member comprising a T-shaped geometry.

2. The clamp assembly of claim 1, wherein the rake bolt comprises a first end and a second end, the rake bolt operatively coupled to the primary rake lever proximate the first end and operatively coupled to the secondary rake lever proximate the second end.

3. The clamp assembly of claim 1, wherein the rake bolt is operatively coupled to the stationary portion proximate the first end and the second end.

4. The clamp assembly of claim 1, wherein the locked position exerts the clamping force on the shifter to maintain the position of the shifter relative to the stationary portion of the steering column.

5. The clamp assembly of claim 1, wherein a bolt is disposed between the secondary rake lever and the shifter to exert the clamping force on the portion of the shifter.

6. A clamp assembly for a vehicle shift mechanism comprising:
   a steering column having a stationary portion and a moveable portion;
   a shifter operatively coupled to the moveable portion of the steering column and slidably engaged with the stationary portion of the steering column;
   a primary rake lever configured to translationally adjust the moveable portion of the steering column;
   a secondary rake lever operatively coupled to the primary rake lever and operative to exert a clamping force on a portion of the shifter during translational adjustment of the moveable portion; and
   a rake bolt operatively coupled to the primary rake lever and to the stationary portion of the steering column, the secondary rake lever operatively coupled to the rake bolt, the rake bolt and the secondary rake lever each rotatable upon rotation of the primary rake lever, the secondary rake lever rotatable between a locked position and an unlocked position, the sliding member clamped between the secondary rake lever and the inner wall of the bracket when the secondary rake lever is in the locked position.

7. A clamp assembly for a vehicle shift mechanism comprising:
   a steering column having a stationary portion and a moveable portion;
   a shifter operatively coupled to the moveable portion of the steering column and slidably engaged with the stationary portion of the steering column;
   a primary rake lever configured to translationally adjust the moveable portion of the steering column;
   a secondary rake lever operatively coupled to the primary rake lever;
   a cam portion of the secondary rake lever configured to bias a bolt against a portion of the shifter in a locked position, the bolt being spring biased to retract away from contact with the portion of the shifter in an unlocked position; and
   a rake bolt operatively coupled to the primary rake lever and to the stationary portion of the steering column, the secondary rake lever operatively coupled to the rake bolt.

8. The clamp assembly of claim 7, wherein the rake bolt comprises a first end and a second end, the rake bolt operatively coupled to the primary rake lever proximate the first end and operatively coupled to the secondary rake lever proximate the second end.

9. The clamp assembly of claim 7, wherein the rake bolt is operatively coupled to the stationary portion proximate the first end and the second end.

10. The clamp assembly of claim 7, wherein the rake bolt and the secondary rake lever are each rotatable upon rotation of the primary rake lever, the secondary rake lever rotatable between the locked position and the unlocked position.

11. The clamp assembly of claim 7, further comprising a bolt spring surrounding a portion of the bolt, the bolt spring biasing the bolt into the unlocked position.

12. The clamp assembly of claim 7, further comprising a plunger operatively coupled to an engagement end of the bolt, the plunger pre-loaded toward the shifter.

13. The clamp assembly of claim 10, further comprising a glide system comprising:
    a sliding member extending from the shifter; and
    a bracket extending from the stationary portion, the bracket having an inner wall defining a slot extending longitudinally along the stationary portion, the sliding member slidably disposed within the slot.

14. The clamp assembly of claim 13, wherein the sliding member comprises a T-shaped geometry.

15. The clamp assembly of claim 13, wherein the sliding member is clamped between the bolt and the inner wall of the bracket when assembly is in the locked position.

\* \* \* \* \*